United States Patent [19]

Eikelenboom

[11] Patent Number: 5,630,705
[45] Date of Patent: May 20, 1997

[54] ROTOR CONSTRUCTION FOR WINDMILL

[76] Inventor: Pieter A. J. Eikelenboom, Wollefoppenweg 27, 2761 DH Zevenhuizen, Netherlands

[21] Appl. No.: 325,297

[22] PCT Filed: Apr. 29, 1993

[86] PCT No.: PCT/NL93/00090

§ 371 Date: Oct. 28, 1994

§ 102(e) Date: Oct. 28, 1994

[87] PCT Pub. No.: WO93/22555

PCT Pub. Date: Nov. 11, 1993

[30] Foreign Application Priority Data

Apr. 29, 1992 [NL] Netherlands ............... 9200786

[51] Int. Cl.$^6$ ............................................. B64C 11/28
[52] U.S. Cl. .................... 416/142; 416/132 B; 416/89
[58] Field of Search .................. 416/87, 88, 89, 416/101, 142, 143, 132, DIG. 4

[56] References Cited

U.S. PATENT DOCUMENTS

| | | | |
|---|---|---|---|
| 2,173,291 | 9/1939 | Ash | 416/88 |
| 2,379,857 | 7/1945 | Bakke. | |
| 2,717,043 | 9/1955 | Isacco | 416/88 |
| 4,020,565 | 5/1977 | Steffen | 416/DIG. 6 |
| 4,168,439 | 9/1979 | Palma | 416/DIG. 6 |
| 4,213,737 | 7/1980 | Gerhardt. | |
| 4,316,698 | 2/1982 | Bertoia | 416/132 B |
| 4,415,311 | 11/1983 | Grana et al. | 416/132 B |
| 4,427,341 | 1/1984 | Eichler | 416/87 |
| 4,483,657 | 11/1984 | Kaiser. | |
| 4,485,991 | 12/1984 | Fuller | 416/DIG. 142 |
| 5,226,805 | 7/1993 | Proven | 416/132 B |

FOREIGN PATENT DOCUMENTS

| | | | |
|---|---|---|---|
| 0016602 | 10/1980 | European Pat. Off. . | |
| 0049634 | 4/1982 | European Pat. Off. . | |
| 1250561 | 12/1960 | France | 416/88 |
| 2507696 | 12/1982 | France . | |
| 647287 | 10/1934 | Germany . | |
| 705270 | 7/1936 | Germany . | |
| 0860029 | 12/1952 | Germany | 416/142 R |
| 2045637 | 5/1979 | Germany | 416/89 |
| 3246635 | 6/1984 | Germany | 416/142 R |
| 7177 | 6/1919 | Netherlands . | |
| 2206653 | 1/1989 | United Kingdom | 416/142 B |

*Primary Examiner*—Edward K. Look
*Assistant Examiner*—Mark Sgantzos
*Attorney, Agent, or Firm*—Deveau, Colton & Marquis

[57] ABSTRACT

A device for converting wind flow energy into mechanical energy has a base construction and a rotor with an essentially horizontal axis mounted on the base construction. The rotor has a number of elongated rotor blades which are connected to a rotary support and extend essentially radially therefrom. Each rotor blade or a part thereof is connected to the rotor support by a hinge connection for tilting the longitudinal axis of the rotor blade or part thereof to a predetermined orientation relative to the axis of rotation of the support. A hinge axis of the hinge connection between the rotor blade and the rotary support is directed at an acute angle both to the longitudinal axis of the rotor blade and to the axis of rotation of the support.

17 Claims, 3 Drawing Sheets

ROTOR CONSTRUCTION FOR WINDMILL

FIELD OF THE INVENTION

The invention relates to a device for converting wind flow energy into mechanical energy, comprising a base construction and a rotor with an essentially horizontal axis mounted on the base construction, the rotor having a number of elongated rotor blades which are connected to a rotary support and extend essentially radially therefrom, each rotor blade or a part thereof being connected to the rotor support by a hinge connection for tilting the longitudinal axis of the rotor blade or part thereof to a predetermined orientation relative to the axis of rotation of the support.

BACKGROUND OF THE INVENTION

Such a device is known from German Patent No 647 287, which describes a windmill having a hinge connection between a rotor blade and the rotary support with a hinge axis extending at rights angles both to the longitudinal axis of the rotor blade and to the axis of rotation of the support. By pivoting the rotor blades or parts thereof from a position in which they are essentially at right angles to the wind direction to an orientation in which they are at a small angle or parallel to the wind direction, the wind-braking area of the rotor can be adjusted to the actual wind speed.

SUMMARY OF THE INVENTION

The object of the invention is to provide a device in which the wind-braking area of the rotor and the effective length of the rotor blades is adjustable, and which has a simpler construction compared to prior art devices, with relatively few component parts.

To reach this aim, the device according to the invention is characterised in that a hinge axis of the hinge connection between a rotor blade and the rotary support is directed at an acute angle both to the longitudinal axis of the rotor blade and to the axis of rotation of the support.

In this way, the angular position of a rotor blade with respect to its longitudinal axis is changed simultaneously with setting a tilted orientation of the rotor blade to bring the rotor blade out of the wind. The maximum wind-braking area, to be used at relatively low wind speeds, is achieved when the rotor blades are at right angles to the wind direction, while pivoting the rotor blades away in the wind direction and pivoting the rotor blades around their longitudinal axes results in a lower wind-braking area to be used a relatively high wind speeds.

Since the part of a windmill rotor blade which is facing away from the axis of rotation of the rotor is most effective for generating power, in another preferred embodiment the support of the rotor is hingedly connected to each rotor blade through an arm assembly, the part of the rotor blade facing the support being situated at a distance from the support. In this way the comparatively little effective part of each rotor blade has been replaced by the arm assembly.

In principle one arm for each rotor blade suffices.

Preferably, the support of the rotor blades is annular, and is mounted in such a way on the base construction that it is supported to allow rotation about its own centre point. Such a support, which a properly chosen inner and outer diameter, provides enough area along its length for the hinged connections to be made. The support may e.g. be made in the form of an annular tube.

The energy conversion by the device according to the invention can be made more constant and less dependent from wind speed variations by giving the rotor the properties of a flywheel. For this purpose, the mass of the support of the rotor blades is made high relative to the mass of the rotor blades. If the support has the form of an annular tube, this tube may e.g. be filled with sand or another filler material to increase its mass.

In a preferred embodiment the annular support is mounted at its radial outer side in a number of rotatable bearing elements. The bearing elements may be small in diameter and consist of conventional roller bearings, but may also have larger diameters. When the rotor has a sufficiently large mass, it will be possible to provide the bearing elements only at the lower part of the support.

Advantageously, at its radial outer side the support is detachably coupled to the drive wheel of a generator. A friction coupling may generally be satisfactory. When using a plurality of generators each coupled to a bearing element, the annular support of the rotor blades can be used for energy generation distributed along a part of, or the whole circumference of the support. By coupling or decoupling drive wheels of generators, the energy generation can be adapted to the actual demand. Also maintenance and repair can be done without interrupting the operation of the device.

When the support has a number of spokes joining at the axis of rotation of the support in a bearing element, the spokes being directed at an acute angle to the axis of rotation of the support, a simple and light-weight bearing construction is obtained.

Another stiff construction which also has good wind-guiding properties is obtained when the support is the base of an essentially cone-shaped reinforcement element, the top of the reinforcement element being on the axis of rotation of the support and being mounted in a bearing element.

EP-A-0 016 602 describes a windmill having a rotor with a central hub which is connected to an annular augmenter by a plurality of radial cables, which support a plurality of radial rotor blades. In a particular embodiment, the rotor blades each are made up of a number of templates covered by a flexible membrane. The length of a blade can be adjusted by moving the templates, and thereby the membrane, along the cables. Accordingly, the wind-braking area is varied. By this measure, the effective rotor diameter of the windmill can be increased at relatively low wind speeds, with the result that the power generated by the windmill can also be high in this wind speed range, at any rate higher than in the case of a windmill with vanes of a fixed length. At relatively high wind speeds the effective rotor diameter of the windmill can be reduced, with the result that the windmill can be kept in operation in this wind speed range with maximum power output, without the risk of damage to the rotor blades. A disadvantage of the known device is its great number of component parts which makes the device complex to build, to service and to repair. Moreover, each cable gives rise to turbulence, which lowers the efficiency of the device. Another disadvantage of the known device is that the rotor blade shape cannot be maintained at strong winds, the membranes deforming between the templates.

In order to further increase the versatility of the device according to the invention, and in particular to increase the adjustability of the wind-breaking area to the actual wind speed, the rotor blades are formed by a number of elongated rotor blade parts, which are adapted to be placed in a position fully or partially overlapping each other in the lengthwise direction, or essentially in line with each other. For a minimum length of such a rotor blade, the component parts of the rotor blade fully overlap each other. A maximum length of such a rotor blade is achieved if all component rotor blade parts are placed in line with each other.

A first advantageous possibility is that a first rotor blade part is connected to a second rotor blade part in such a way that it can slide essentially parallel to the second rotor blade part in the lengthwise direction thereof, and provision is made for drive means for sliding the first rotor blade part over a predetermined distance relative to the second rotor blade part. A minimum length of the rotor blade is achieved if the rotor blade parts fully overlap each other, and the maximum rotor blade length is achieved if the rotor blade parts are placed in line with each other. Any intermediate length of the rotor blade can be set by selecting a suitable overlap of the rotor blade parts, so that a continuous rotor blade length adjustment is possible. A second rotor blade part preferably comprises an internal space in which the first rotor blade part can be accommodated.

A flexible, light-weight embodiment of drive means for rotor blade parts is obtained by using flexible wire-type elements, for example, Bowden cables or wires which can absorb both pressure and tensile forces.

In another preferred embodiment, the rotor blades comprise one or more flexible casings to which a fluid can be supplied, for the purpose of filling the casings, so that they assume the shape of a rotor blade or rotor blade part, and from which casings the fluid can be discharged, for the purpose of emptying the casings, so that they lose the shape of a rotor blade or rotor blade part. A particularly light-weight construction can be obtained if a gas, for example air, is selected as the fluid. However, it is also possible to use a liquid for filling the casings.

In the last-mentioned embodiment, each rotor blade preferably consists of a number of casings which are placed one after the other in the lengthwise direction thereof, and by means of which the length of the rotor blade can be simply increased or reduced in stages to the desired size.

In order to improve the rigidity of a rotor blade which is made up of fluid-filled casings, the casings of the rotor blades can be supported by a frame which determines the setting and position of the casings in the filled and empty state. Such a frame can in turn be filled with a fluid at a predetermined pressure, in order to increase the rigidity of the frame.

A particularly advantageous embodiment is obtained if the frame comprises a system of channels with controllable valves, by means of which a connection can be produced selectively between a casing and a fluid supply line or fluid discharge line. The frame can be constructed of e.g. hollow tubes, which themselves form the above-mentioned channels.

BRIEF DESCRIPTION OF THE DRAWINGS

The invention is explained with reference to the drawings, in which.

In the figures similar reference symbols indicate similar parts.

DETAILED DESCRIPTION OF THE PREFERRED EMBODIMENTS

Figure 1:
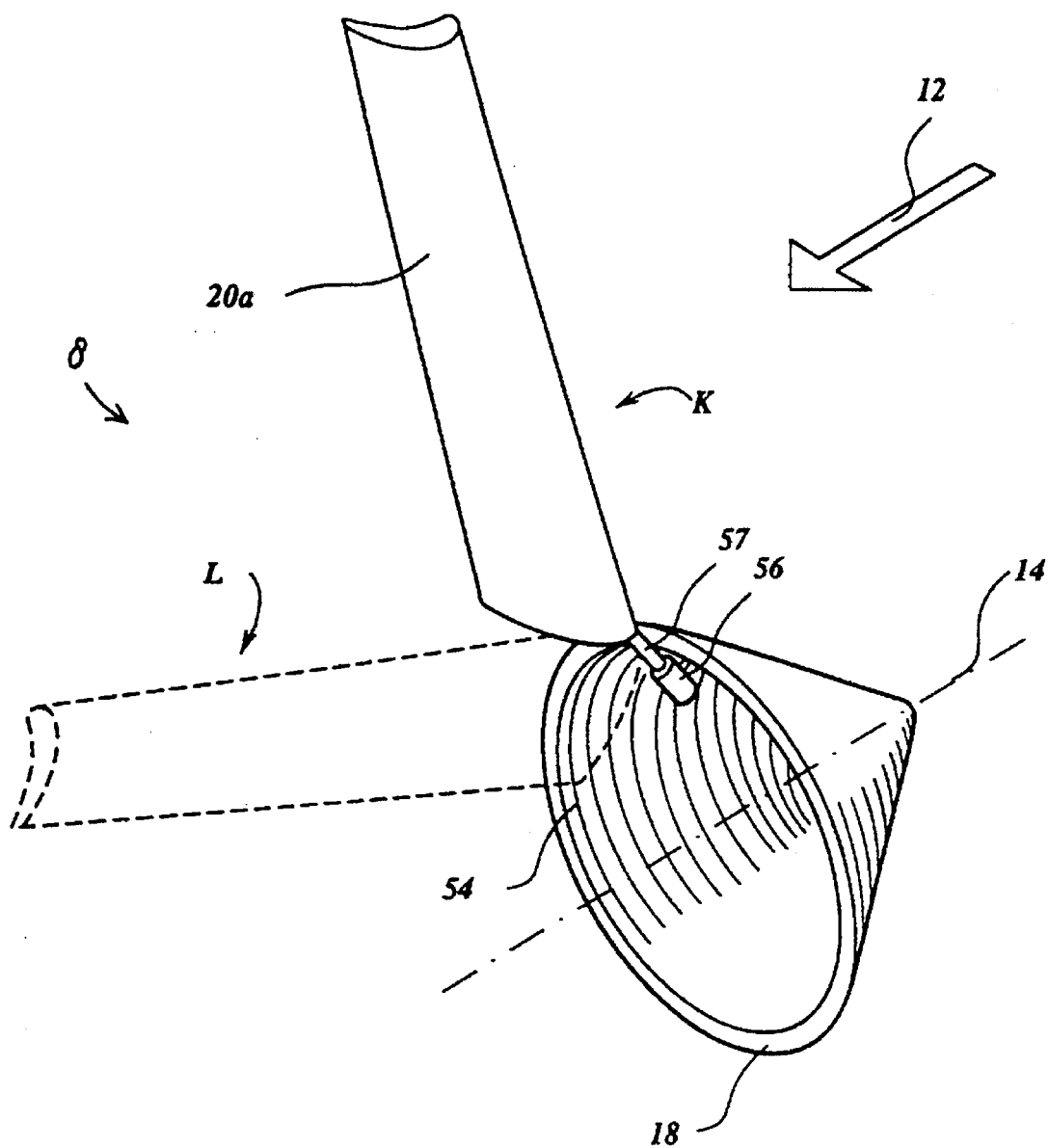
FIG. 1 shows a perspective diagrammatic view of a rotor embodiment of a device according to the invention.

The windmill rotor shown in FIG. 1 has a support which essentially consists of a ring 18 and a cone-shaped reinforcement element 54. At the inside of the reinforcement element 54 a number of drive elements 56 are fixed, only one of which is shown in the figure. The drive element 56 has a rotatable shaft 57 defining a hinge axis for a rotor blade 20a. The shaft 57 is directed at an acute angle both to the plane through the axis of rotation 14 of the support, in which plane the rotor blade 20a extends, and to the axis of rotation 14 itself. The rotor blade 20a is fixed to the shaft 57 at an angle which is larger than 90°. By rotating the shaft 57, the rotor blade 20a can be brought from the position K to the position L shown in dashed lines. As a result of the particular orientation of the hinge axis, the rotor blade 20a, while pivoting from position K to position L, at the same time pivots around its longitudinal axis. Both pivoting movements bring the rotor blade 20a out of the wind blowing in the direction 12.

Figure 2:
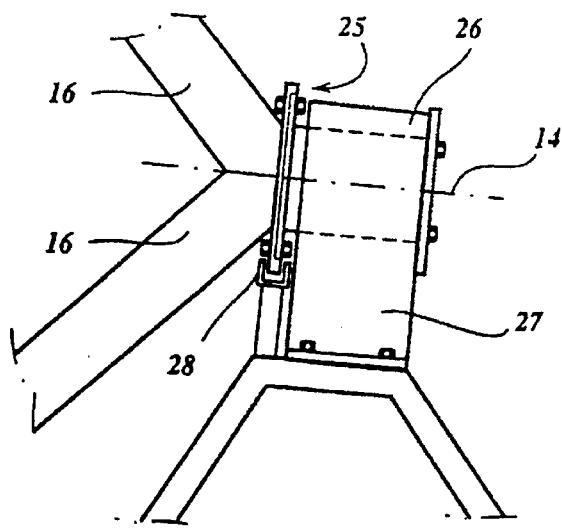
FIG. 2 shows on a larger scale an alternative detail of the device of FIG. 1.

Referring to FIG. 2, at the point where spokes 16 supporting the ring 18 come together, a flange connection 25 to a shaft 27 is made. The shaft is accomodated in a combined roller and thrust bearing 26. For repair and maintenance, the flange connection 25 may rest in a U-shaped support 28. The bearing 26 is fixed on the top part of a base construction 4.

Figure 4:
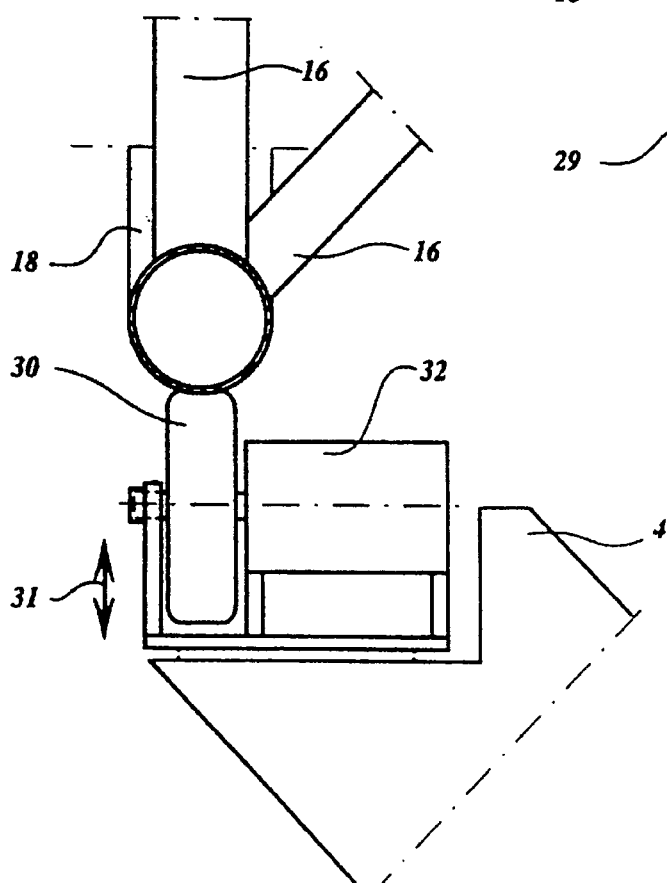
FIG. 4 shows an alternative construction for the part of the device shown in FIG. 3.
Figure 3:
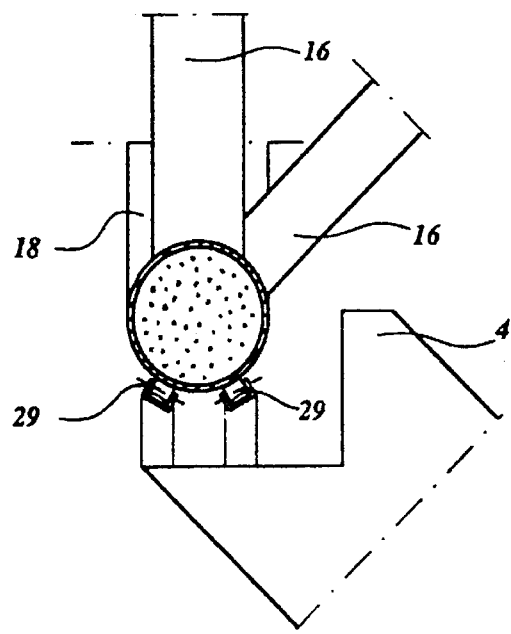
FIG. 3 shows, partially in cross-section, a further alternative detail of the device of FIG. 1.

In FIGS. 3 and 4 a tubular ring 18 with a circular cross-section is shown. For clarity, neither rotor blades nor arms for supporting rotor blades and fixed to the ring 18, are shown. Spokes 16 support the ring 18 to keep into shape. The hollow ring 18 may be filled with solid material, e.g. sand, to increase its inertia. Referring to FIG. 3, the ring 18 is mounted on roller bearings. 29, of which the curve of the outer surface is complementary to the curvature of the outer surface of the ring 18. The roller bearings 29 are fixed on the top part of the base construction 4 of the windmill and may be placed at regular intervals along the circumference of the ring 18.

In FIG. 4 the ring 18 is coupled to one or more relatively large rollers 30, which are drive wheels for directly mechanically coupled generators 32, e.g. for converting the mechanical energy delivered by the ring 18 to the roller 30 into electrical energy. The rollers 30 may be made of flexible material, such as a rubber compound, and be in friction engagement with the ring 18. The rollers 30 and the generators 32 are provided movably on the top part of the base construction 4 (symbolically indicated by double arrow 31) such that the rollers 30 may be brought into, or out of contact with the ring 18 to be able to tune the energy generation to the actual energy demand. Rollers 30 and generators 32 may be placed at regular intervals along the circumference of the ring 18.

Figure 5:
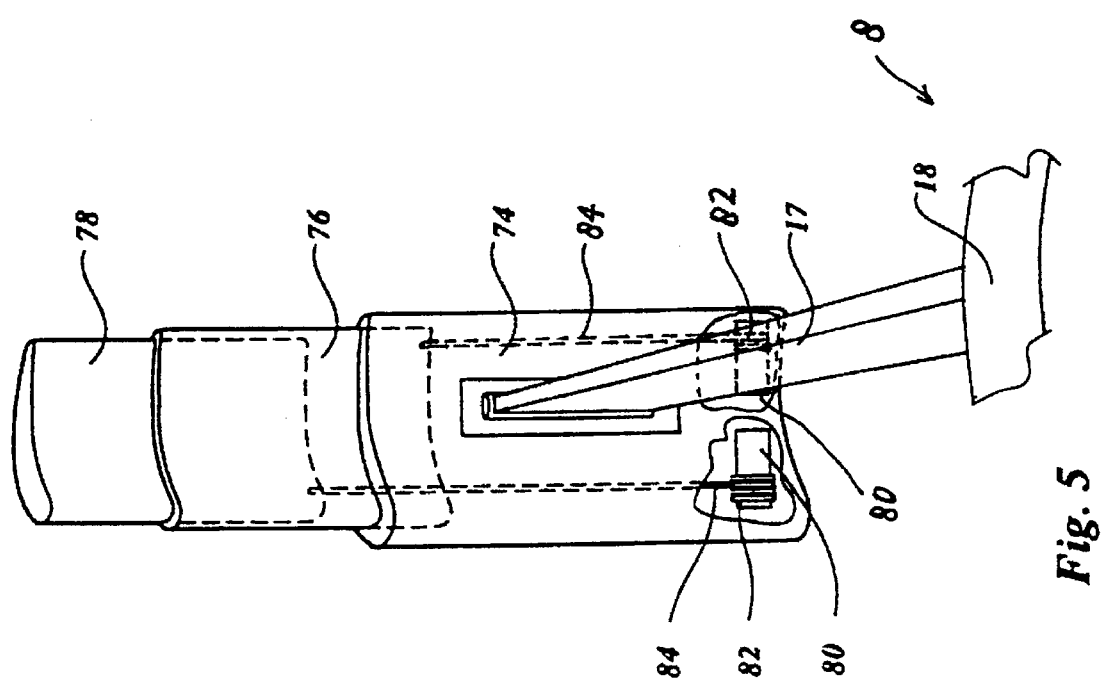
FIG. 5 shows a diagrammatic, partially cut-away view in perspective of an embodiment of a rotor blade.

FIG. 5 shows a part of a ring 18 of a rotor 8. An elongated, hollow first rotor blade part 74 is hingedly connected to the arm 17, which first rotor blade part 74 can contain an elongated, hollow second rotor blade part 76. The second rotor blade part 76 can in turn contain an elongated third rotor blade part 78. The rotor blade parts can be shifted relative to each other in the lengthwise direction thereof by means of drive means fitted in the first rotor blade part 74, comprising a motor 80 which can drive a spindle 82. Wound on the spindle 82 is a wire 84 which can be subjected to both tensile stress and pressure, and which is led in a suitable manner into the interior of the first and second rotor blade part 74 and 76, for the purpose of shifting the third rotor blade part 78. Drive means for the second rotor blade part 76 can be provided in a similar way.

Figure 6:
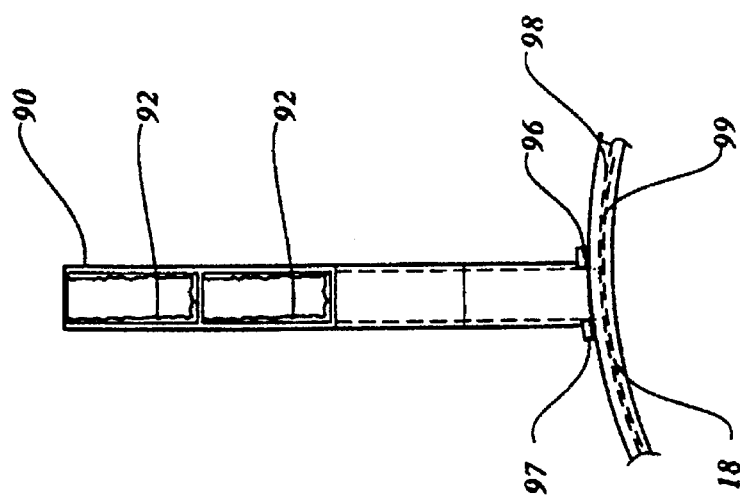
FIG. 6 shows a diagrammatic view of a rotor blade in another embodiment.

FIG. 6 shows a rotor ring 18 with a rotor blade 20a hingedly connected thereto. The rotor blade 20a made up of a frame 90 with four frame parts which can be closed selectively by filling a flexible casing 92 with a fluid for setting the effective wind-catching area of the rotor. In the case of rotor blade 20a two of the four frame parts are thus closed, while the two frame parts at the free end of the rotor blade are open, and the corresponding casing 92 is empty and extends along the frame 90. The frame 90 comprises a system of channels with controllable valves 96 and 97, by means of which a connection can be produced selectively between a casing 92 and a fluid supply line 98 or fluid discharge line 99. The control of the rotor blade orientation and length can be achieved by measuring the current wind speed at a distance from the windmill and, on the basis of the result of this measurement, setting such a wind-braking area that the mechanical power generated by the windmill is held approximately constant, taking into account the limits of the mechanical stress which the windmill parts can bear. Another control criterion can be the maximisation of the mechanical power generated in the prevailing wind.

Although various embodiments for setting the rotor blades are described in the above, it will be clear that any desired combination of the described embodiments can also be used.

In the drawings and specification, there have been set forth preferred embodiments of the invention, and although specific terms are employed, they are used in a generic and descriptive sense only and not for purposes of limitation.

What is claimed is:

1. A device for converting wind flow energy into mechanical energy, said device comprising a base construction and a rotor, said rotor being mounted on the base construction and comprising an essentially horizontal axis, a number of elongated rotor blades, and a rotor support comprising at least one annular tube, said rotor blades being connected to said rotor support and extending essentially radially therefrom, a portion of each rotor blade being connected to the rotor support by a hinge connection for tilting the longitudinal axis of the rotor blade to a predetermined orientation relative to the axis of rotation of the rotor support, wherein a hinge axis of the hinge connection between the rotor blade and the rotor support is directed at an acute angle both to the longitudinal axis of the rotor blade and to the axis of rotation of the support.

2. A device according to claim 1, wherein the rotor support is hingably connected to each rotor blade through an arm assembly, the part of the rotor blade facing the rotor support being situated at a distance from the rotor support.

3. A device according to claim 1, wherein the rotor support is rotationally mounted on the base construction to allow rotation of said rotor support about its own centre point.

4. A device according to claim 3, wherein the mass of the rotor support is greater than the mass of the rotor blades.

5. A device according to claim 3, wherein the rotor support is mounted at its radial outer side in a number of rotatable bearing elements.

6. A device according to claim 3, wherein at its radial outer side the rotor support is detachably coupled to the drive wheel of a generator.

7. A device according to claim 3, further comprising a number of spokes extending inwardly from said annular tube portion of said rotor support at an angle acute to the axis of rotation of said annular support, said spokes being connected to a shaft having an axis coincident with the axis of rotation of said annular support.

8. A device according to claim 3, wherein the rotor support is the base of an essentially cone-shaped reinforcement element, the top of the reinforcement element being on the axis of rotation of the support and being mounted in a bearing element.

9. A device according to claim 1, wherein the rotor blades comprise a number of elongated rotor blade parts, which can move between a first position wherein said elongated rotor blade parts are at least partially overlapping each other in their lengthwise direction, and a second position wherein said elongated rotor blade parts are essentially in line with each other.

10. A device according to claim 9, wherein a first rotor blade part is connected to a second rotor blade part to allow said first rotor blade part to slide essentially parallel to the second rotor blade part in the lengthwise direction thereof, and wherein said device further comprises drive means for sliding the first rotor blade part over a predetermined distance relative to the second rotor blade part.

11. A device according to claim 10, wherein the second rotor blade part comprises an internal space in which the first rotor blade part can be accommodated.

12. A device according to claim 9, wherein the rotor blade parts can be moved relative to each other by using flexible wire-type elements.

13. A device according to claim 12, wherein the wire-type elements consist of Bowden cables.

14. A device for converting wind flow energy into mechanical energy, said device comprising a base construction and a rotor mounted on said base construction, said rotor comprising a rotor support and a number of rotor blades attached to said rotor support by a hinge connection and extending essentially radially from said rotor support, each said rotor blade comprising at least one flexible casing, said device further comprising means for selectively supplying a fluid to said flexible casings whereby said casings assume the shape of a rotor blade portion, and for discharging the fluid from said flexible casings whereby said casings lose the shape of the rotor blade portion.

15. The device of claim 14, wherein each rotor blade comprises a number of casings placed one after the other in the lengthwise direction thereof.

16. The device of claim 14, wherein the casings of the rotor blades are supported by a frame which determines the setting and position of the casings in the filled and empty state.

17. The device of claim 16, wherein the frame comprises a system of channels with controllable valves, by means of which a connection can be produced selectively between a casing and a fluid supply or fluid discharge line.

* * * * *